United States Patent [19]
Thompson

[11] 3,871,667
[45] Mar. 18, 1975

[54] PRESSURE SEALED BONNET PACKING RING

[75] Inventor: Bruce Thompson, Wethersfield, Conn.

[73] Assignee: Ametek, Inc., New York, N.Y.

[22] Filed: Jan. 7, 1974

[21] Appl. No.: 431,048

[52] U.S. Cl................................. 277/115, 220/236
[51] Int. Cl....................... F16j 15/06, F16k 31/50
[58] Field of Search .......... 251/213, 214, 314, 316, 251/317, 330; 277/105, 115, 117, 207; 220/235, 236, 237

[56] References Cited
UNITED STATES PATENTS
2,622,763  12/1952  MacGregor........................ 220/236
2,783,912  3/1957  Hobbs................................ 220/236

*Primary Examiner*—Martin P. Schwadron
*Assistant Examiner*—David R. Matthews
*Attorney, Agent, or Firm*—Smythe & Moore

[57] ABSTRACT

A packing ring for sealing a bonnet within an opening of a valve casing comprises an annular member having a rectangular cross section divided into a thin portion and a solid portion by a diagonal of the cross section. When positioned in the space between the bonnet and the valve opening wall, the thin portion of the ring is urged into a triangular groove in the wall of the opening by a projection of the means for mounting the bonnet within the opening.

3 Claims, 5 Drawing Figures

PATENTED MAR 18 1975 3,871,667
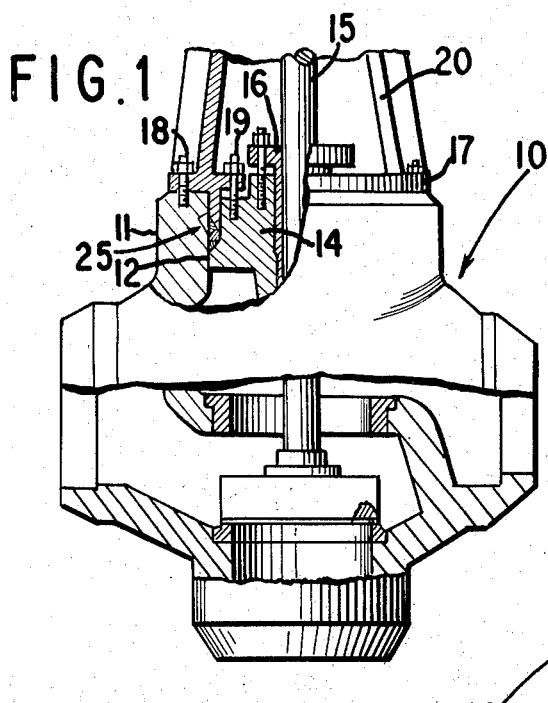
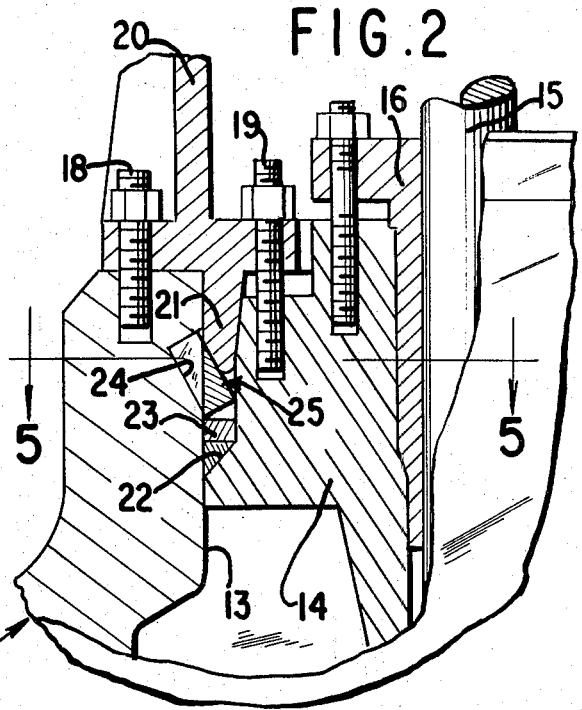
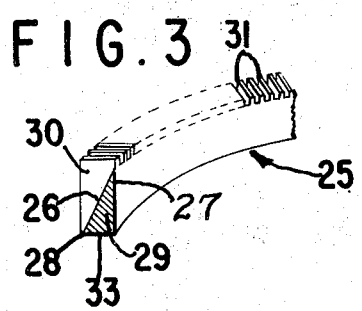
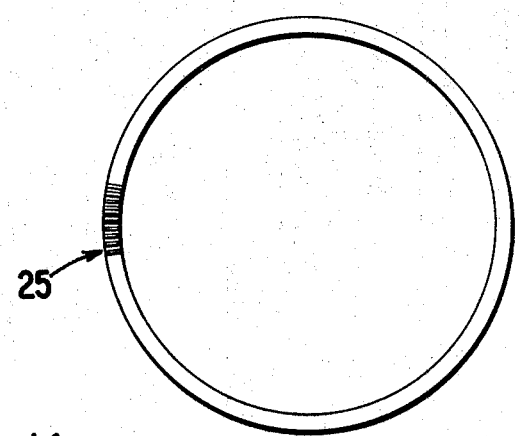
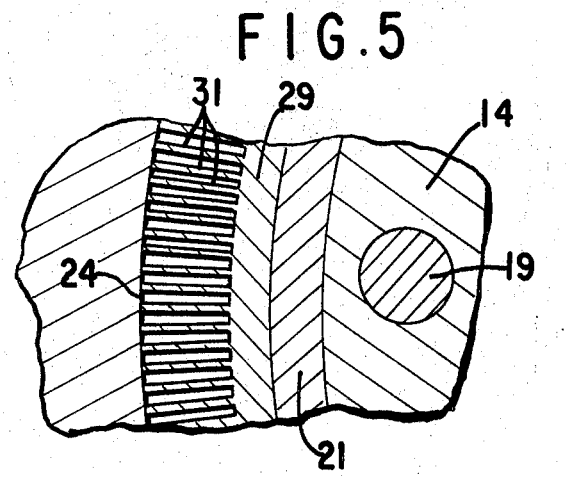

PRESSURE SEALED BONNET PACKING RING

The present invention relates to a closure assembly for a pressure sealed valve bonnet, and more particularly, to sealing ring and structure for disposing the ring in sealing position.

Valves are generally provided with a valve chamber having an opening therein which is closed by a disengagable bonnet so as to permit access into the chamber to make necessary repairs or adjustments to the valve mechanism. The bonnet is generally held in position in the opening by a flanged member interconnecting the bonnet and the valve chamber wall. The flanged member may extend upwardly to define a further chamber upon which the valve operator may be mounted.

Various forms of sealing rings and other packing structures have been proposed to effect a tight seal between the bonnet and the wall of the opening. The problems in sealing increase considerably as the pressure handled by the valve is increased. It has been proposed to provide various forms of sealing rings which are wedged or compressed to effect a tighter sealing relationship. However, such rings have been generally unsatisfactory since they may become deformed so as to complicate the procedure of disengaging the bonnet. Also, the mere compression of such rings does not necessarily produce the desired sealing relationship.

One of the objects of the invention is to provide an improved packing ring for a pressure sealed valve bonnet.

Another object of the present invention is to provide a sealing ring for a pressure sealed valve bonnet wherein the ring can be pushed into a tight sealing relationship upon mounting of the bonnet on the valve chamber.

According to one aspect of the present invention, a valve may be provided with a valve chamber having an opening in which a bonnet is positioned. The bonnet has an annular shoulder in the space between the bonnet and the wall of the opening and there is a triangular shaped annular groove in the wall of the opening. A sealing ring comprising an annular member with a generally rectangular cross section with the longer dimension axial of the ring disposed in the space between the bonnet and the opening wall upon the shoulder. The cross section of the annular member comprises inner and outer portions defined substantially by a diagonal of the cross section. The inner portion is solid and has a plurality of axially extending circumferentially spaced fins thereon with the fins defining the outer portions.

To secure the bonnet in the opening, a flanged member having an annular projecting portion is mounted between the valve chamber and the bonnet so that the projecting portion engages the fins on the sealing ring and urges the fin portion into the triangular opening in the wall of the chamber.

Other objects and advantages of the present invention will become apparent upon reference to the accompanying description when taken in conjunction with the following drawings which are merely exemplary.

IN THE DRAWINGS

FIG. 1 is a side elevational view of a valve incorporating the present invention with portions of the valve being cut away to show details of construction;

FIG. 2 is an enlarged sectional fragmentary view of the valve in FIG. 1 showing the mounting of the sealing ring;

FIG. 3 is a perspective view of a portion of the sealing ring with one end of the rings being in section;

FIG. 4 is a top plan view of the sealing ring; and

FIG. 5 is a sectional view taken along the line 5—5 of FIG. 2.

Proceeding next to the drawings wherein like reference symbols indicate the same parts throughout the various views, a specific embodiment of the present invention will be described in detail.

Indicated generally at 10 in FIG. 1 is a valve incorporating the present invention and comprising a valve casing 11 having an opening 12 therein with the wall of the opening being shown at 13 in FIG. 2. The opening is closed by a bonnet 14 through which the valve stem 15 passes and is movable in a packing 16 mounted within the bonnet. The bonnet is held in position by a mounting ring 17 which is bolted at 18 and 19 to the valve casing and bonnet respectively.

Extending upwardly from the mounting ring is a structure 20 which may be opened or closed and which supports the operator for valve stem 15.

On the lower face of mounting ring 17 is an annular projecting portion 21 which extends into the space formed between the opening wall 13 and bonnet 14. Bonnet 14 is provided with an annular shoulder 22 which fits closely within the opening 12 and upon which is positioned packing or sealing rings 23 as known in the art.

Within the opening wall 13 and above the shoulder there is an annular groove 24 which has a triangular cross section as can best be seen in FIG. 2.

One form of sealing ring has a substantially rectangular section with the longer dimension extending axially of the ring. A diagonal 26 between substantially the upper inner corner 27 and lower outer corner 28 of the ring divides the section of the ring into an inner solid portion 29 and an outer fin-like portion 30. The ring should be of sufficient cross section so that it will not compress when under load. Fin portion 30 comprises a plurality of substantially triangular axially extending fin portions 31.

When the ring 25 is positioned on top of the packing material 23 between the opening wall 13 of the valve casing and the bonnet, the upper or thin portion 30 of the sealing ring will be urged into the triangular groove 24 by projecting portion 21 when the mounting ring is positioned on top of the valve casing and bonnet. Thus, the finned or serated portion 30 will be flexible enough to be accommodated within the triangular groove and can be curved outwardly under the urging of the annular projection 21 while the lower edge 33 of the solid portion of the ring rests on the packing. The result is a close, tight fitting of the sealing ring between the valve opening wall and the bonnet, and the ring easily adapts itself to any irregularities between the surfaces.

In another form, a plurality of separated elements (not shown) can be used.

It will be understood that various details of construction and arrangement of parts may be made without departing from the spirit of the invention except as defined in the appended claims.

What is claimed is:

1. In a valve, the combination of a valve chamber having an opening therein, a bonnet positioned in said opening and defining a space between said bonnet and the wall of said opening, said bonnet having an annular portion thereon defining a shoulder within said space, there being a triangular sectioned annular groove in the wall of said opening above said bonnet shoulder, an annular packing ring within said space upon said bonnet shoulder, and means for mounting said bonnet within said opening and having an annular projection thereon extending into said space to urge the upper portion of the packing ring into said triangular shaped annular groove.

2. In a valve as claimed in claim 1 wherein said annular packing ring has a vertical cross section with the longer dimension being axially of the ring, the cross section of said annular member comprising inner and outer portions defined substantially by a diagonal of said cross section, one of said cross-section portions being solid and the other of said portions comprising a plurality of axially extending circumferentially spaced fins.

3. In a valve as claimed in claim 2 wherein the inner portion of said packing ring is solid and the outer portion is finned such that the finned portion is urged into the triangular shaped groove in the wall of the opening.

* * * * *